United States Patent [19]

Blank

[11] 3,907,740
[45] Sept. 23, 1975

[54] STABLE, HIGH SOLIDS METHYLATED UREA-FORMALDEHYDE COATING COMPOSITIONS

[75] Inventor: Werner Josef Blank, Wilton, Conn.

[73] Assignee: American Cyanamid Company, Stamford, Conn.

[22] Filed: June 10, 1974

[21] Appl. No.: 482,397

Related U.S. Application Data

[63] Continuation-in-part of Ser. Nos. 222,322, Jan. 31, 1972, abandoned, and Ser. No. 407,118, Oct. 17, 1973, abandoned.

[52] U.S. Cl. .................... 260/33.4 R; 260/31.2 N
[51] Int. Cl.² ........................................... C08K 5/10
[58] Field of Search ................ 260/33.4 R, 31.2 N

[56] References Cited
UNITED STATES PATENTS

| | | | |
|---|---|---|---|
| 2,327,984 | 8/1943 | West | 260/70 A X |
| 2,615,003 | 10/1952 | Suen et al. | 260/33.4 |
| 2,995,541 | 8/1961 | Kropa et al. | 260/70 A X |
| 3,247,149 | 4/1966 | Alek | 260/33.4 R X |

Primary Examiner—Lewis T. Jacobs
Attorney, Agent, or Firm—Evans Kahn

[57] ABSTRACT

Solutions composed of a mixture of syrupy thermosetting methylated urea-formaldehyde resins (urea:formaldehyde: methanol molar ratio = 1 : 2–3 : 1–2.5; molecular size predominantly monomer to trimer) and 20 – 90% by weight of a $C_3$–$C_{18}$ polyhydric compound having a molecular weight less than about 500 are fluid and stable, and provide coatings of superior properties when they are applied as lacquers, enamels etc. to a wood or metal surface and thermoset thereon.

10 Claims, No Drawings

STABLE, HIGH SOLIDS METHYLATED UREA-FORMALDEHYDE COATING COMPOSITIONS

This is a continuation-in-part of my copending applications Ser. Nos. 222,322 and 407,118 filed on Jan. 31, 1972, and Oct. 17, 1973, and both now abandoned.

The present invention relates to novel solutions substantially composed of mixtures of thermosetting methylated urea-formaldehyde resins and branched chain polyhydric $C_3$–$C_{18}$ compounds, both of low molecular size; to surface coatings having a content of these solutions; and to solid shaped substrate surfaces coated with the solutions in thermoset state.

It is known that thermosetting methylated liquid urea-formaldehyde resins can be employed to coat wood and metallic substrates. Unfortunately, such resins are applied as low solids solutions containing not more than about 70% solids because solutions of higher solids content are too viscous to be applied by most industrially practical means. Moreover, when solutions of from 80 to 100% of such methylated urea-formaldehyde resins and 0 to 20% of a straight-chain polyfunctional alcohol are applied to surfaces and are thermoset thereon, the resulting coatings are frequently unsatisfactory owing to the tendency of the solutions to form imperfect films. The solutions crawl and leave craters while they are being heated to thermosetting temperatures, and the resulting coatings possess poor chemical and physical properties, having poor resistance to common organic solvents and being unduly either hard and brittle, or sticky, soft, and rubbery. A composition which would provide coatings free of these shortcomings would fulfill a long-felt need in the art.

The solutions of the present invention consist essentially of (A) 80 to 10% by weight of a mixture of a thermosetting methylated urea-formaldehyde condensate in 1 : 2–3 : 1–2.5 urea: formaldehyde-methanol molar ratio, 10 to 60% of said condensate by weight. being in monomeric state, 10 to 75% thereof being in dimeric state, 5 to 60% thereof being in trimeric state, and 10 to 30% thereof being in higher than trimeric state, said percentages totalling 100%; and (B) 20 to 90% by weight of one or more branched chain polyhydric compounds containing 3 to 18 carbon atoms and having a molecular weight less than 500. The composition thus is of very low average molecular weight.

As a result of the requirement that the urea condensate be predominantly in the monomeric-trimeric range and that it have a content of at least three of the aforesaid mer forms, the above-described solutions in preferred instances possess the following beneficial properties.

1. The solutions have a low viscosity. As a result, they can be sprayed at 100% solids. No diluent or thinner is required, thus eliminating a fire hazard and need for a solvent recovery system.

2. The solutions are compatible with known thickeners, and so can be rendered suitable for application by brush, knife, or roll.

3. The solutions possess adequate stability. They thus can be shipped at 100% solids even when containing a condensation catalyst and need not contain inhibitors or stabilizers. The solutions thus may be used "as shipped," and the user need not perform any mixing step.

4. The solutions are soluble in water and in 3 : 1 butanol-toluene mixture. They can thus be thinned with water, and can be used as components of spirit soluble varnishes and enamels. Equipment containing the solutions can be readily cleaned with water or with an organic solvent.

5. When thermocured, coatings of the solutions possess excellent flexibility and resistance to harm by solvents. As a result, the solutions can be used to provide coatings on sheet metal or wood intended for contact with organic solvents.

The branchings in the chains of the polyhydric compound prevent the solutions of the present invention from "crawling" or forming pinholes and craters on the surfaces to which they have been applied while the coatings are being heated to temperatures at which they thermoset. As a result, the surfaces are uniformly and completely coated, and pieces lacquered or enamelled with the solutions are generally passed on inspection as satisfactory.

The solutions of the present invention can contain any of the materials which are now customarily present in methylated urea-formaldehyde coating compositions. Thus they may contain viscosity flow modifiers (generally termed thickening agents or anti-sag agents) of the polyester, polyether or acrylic resin types, generally in amount from 5 to 20% of the overall composition. If further desired the solutions can contain a volatile aqueous or organic solvent as diluent or thinner together with a non-volatile thickening agent. The viscosity of the resulting composition is low, but the viscosity increases after the coating has been sprayed (because of evaporation of solvent). By this means a comparatively viscous coating can be applied which possesses less tendency to sag on vertical surfaces. Suitable diluents include water, ethanol and 3 : 1 butanol : toluene, and a variety of anti-sag agents are known in the art. The solutions can also contain dyes and pigments and acid catalysts.

An important property of the solutions of the present invention is that they are extremely fluid at high solids content. As a result, the solutions of the present invention can be applied by knife coater, by brush or by roller coater even at 100% solids, and can be applied by spray when thinned, to any desired shaped solid surface. It is an extraordinary feature of the invention that in preferred instances the solutions, when prepared, are usually too thin to be sprayed satisfactorily on vertical surfaces. In such instances the solutions can be rendered suitable for spraying by addition of a non-volatile thickener, as described above.

The aforesaid urea : formaldehyde : methanol molar ratio range of 1 : 2–3 : 1–2.5 is critical for the composition of the urea-formaldehyde-methanol condensate, for the following reasons.

When the amount of reacted formaldehyde is less than about two mols per mol of reacted urea, the condensate thermosets comparatively slowly and produces films which are unacceptably soft. Three mols of formaldehyde is the virtual maximum which it is possible to react. The range of 2–3 represents the maximum amount of formaldehyde which it is practical to react, and so represents the preferred range.

With regard to methanol, when the amount of reacted methanol is less than one mol per mol of urea, the resulting condensate tends to have poor compatability with the added polyhydric compound, so that thermosetting is undesirably slow and the films obtained are comparatively weak. The value of 2.5 mols represents the largest amount which provides good compatability with the polyhydric compound, fast thermosetting properties, and comparatively strong films.

The solutions can be formulated into lacquer- and enamel-type coating compositions by addition thereto of known dyes and pigments; plasticizers; ultra-violet absorptive compounds; insecticides; supplementary coating compositions including oxidizing type alkyd resins; the solvent thickening agent compositions described above; and curing catalysts.

Methylated urea-formaldehyde resins suitable for formulation of solutions of the present invention are disclosed in U.S. Pat. applications Ser. Nos. 216,257 and 216,258 filed on Jan. 7, 1972, by Leonard J. Calbo, Jr. now abandoned which also disclose methods for their preparation. The condensation products of which these syrups are composed are about 30% monomeric by weight, 50% dimeric and 20% trimeric.

According to one method, the urea condensate can be prepared by refluxing in the anhydrous state a urea, formaldehyde, and methanol at a pH of at least 8 to effect urea-formaldehyde reaction, continuing the reaction at a pH between 4.5 and 5.5, lowering the pH to from 2 to 3 and continuing the reaction for about one hour until a syrupy, low polymeric material has been obtained, not more than about a third of which has a molecular size larger than trimeric.

Exemplary of polyhydric branched-chain compounds which contain at least 3 and preferably from 6 to 18 carbon atoms or more, are: trimethylol ethane, trimethylol propane, 1,2-propylene glycol, 2-ethyl-1,3-hexanediol, neopentyl glycol, trimethyl pentane diol, and hydroxypivalyl hydroxypivalate. Preferably the polyhydric compounds have molecular weights less than about 500. When the compounds have higher molecular weights, a volatile solvent material is generally required to effect compatibility as a result of which the solids content of the solution must be below 80%.

Moreover, mixtures of, for instance, equal parts by weight of (a) the latter polyhydric compound and (b) a branched-chain monohydric alcohol, such as isodecanol or isooctadecanol, can, if desired, be employed in preparing the solutions of the present invention. These polyols are substantially non-volatile at thermosetting temperatures.

The urea condensate branched chain polyhydric compound need not contain a catalyst, particularly if the composition is to be cured at high temperature. However, if a thermosetting, or "curing" temperature of less than about 150°C. is to be utilized, an acidic polycondensation catalyst is required to obtain curing within a practical period of time, say between about 5 seconds and sixty minutes. Typical active catalysts are: phosphoric acid, butylphosphoric acid, sulfuric acid, hyrochloric acid, methane sulfonic acid, p-toluenesulfonic acid, magnesium bromide and equivalents of the same. Previously known latent catalysts can also be used, for example ammonium chloride.

The invention is further illustrated by the examples which follow. These examples are best embodiments of the invention, and the claims are not to be construed as limited thereto.

EXAMPLE 1

This example illustrates the preparation of a methylated urea-formaldehyde resin which can be employed as a component of the coating solution of the present invention.

To a two-liter, three-necked flask equipped with stirrer, condenser, and thermometer are charged 288 parts of methanol, 297 parts of 91% paraformaldehyde, and triethanolamine to adjust the pH to 9 to 10. The temperature is raised to 50°C. and 180 parts of urea are added over a period of twenty minutes. The mixture is heated to reflux (81°C.). Refluxing is continued for 25 to 30 minutes or until the mixture is clear and homogeneous. The mixture is cooled to 75°C. and to it is added over seven minutes (to prevent excessive exotherm) sufficient 90% aqueous formic acid to decrease the pH of the mixture to 4.5 – 5.5. The mixture is then brought to reflux (about 84°C.), and refluxing is continued for about 3 hours. At the end of this period, the rate of reaction of the methanol with the urea-formaldehyde reaction product has become slow.

The mixture is then allowed to cool to 25°C., and 70% aqueous nitric acid is uniformly added over seven minutes to adjust the pH downward to 2 – 3. The mixture is then stirred at 25° to 30°C. until a urea-formaldehyde-methanol polymer is formed. About one hour is generally required. The mixture is then adjusted to pH 7 to 8 with 50% aqueous sodium hydroxide solution and stripped under reduced pressure to remove substantially all of the volatiles present (water, formaldehyde, and methanol). The terminal temperature of the stripping step is about 100°C. The resultant syrup is cooled to room temperature. It is composed of interreacted urea, formaldehyde and methanol in 1 : 2.4 : 1.6 molar ratio, and is watersoluble. Two thirds or less is in trimeric or lower state.

EXAMPLES 2 to 13

These examples illustrate the preparation and properties of a variety of solutions of the urea resin of Example 1, a branched chain $C_3$–$C_{18}$ polyhydric compound having a molecular weight below 500, and (or, for the sake of comparison, some other alcohol), optionally, an acid catalyst. The compositions of the solutions are shown in the table below, together with the specific polyhydric compound or other alcohol employed. The solutions are fluid. Although containing an active acid catalyst, each solution has a pot life of at least seven days, and is therefore regarded as stable. The solutions are poured over 4 × 12 inch stainless steel panels and are allowed to drain for ten minutes. The panels are then baked or cured at 125°C. for ten minutes.

TABLE I

| COMPOSITION Parts by weight | EXAMPLES | | | | | | | | COMPARATIVE EXAMPLES | | | |
|---|---|---|---|---|---|---|---|---|---|---|---|---|
| | 2 | 3 | 4 | 5 | 6 | 7 | 8 | 9 | 10 | 11 | 12 | 13 |
| Urea Resin (Example 1) | 8 | 20 | 30 | 30 | 40 | 40 | 80 | 90 | 40 | 60 | 25 | 35 |
| Hydroxypivalyl Hydroxypivalate | 92 | 80 | 70 | 35 | 30 | 60 | 20 | 10 | — | — | — | — |
| 2-Methyl-2,4-Pentanediol | — | — | — | 35 | 30 | — | — | — | — | — | — | — |
| 1,5-Pentanediol | — | — | — | — | — | — | — | — | 60 | 40 | — | — |
| 1,6-Hexanediol | — | — | — | — | — | — | — | — | — | — | 12 | 12 |

TABLE I-continued

| COMPOSITION Parts by weight | EXAMPLES | | | | | | | | COMPARATIVE EXAMPLES | | | |
|---|---|---|---|---|---|---|---|---|---|---|---|---|
| | 2 | 3 | 4 | 5 | 6 | 7 | 8 | 9 | 10 | 11 | 12 | 13 |
| p-Toluol Sulfonic Acid (20% Aqueous Solution) | 1.5 | 1.5 | 1.5 | 1.5 | 1.5 | 1.5 | 1.5 | 1.5 | 3 | 3 | 3 | 3 |
| Ethanol | — | — | — | — | — | — | 10 | — | — | — | — | — |
| Knoop Hardness (Tukon Hardness) | Sticky | 0.5–.6 | 3.5 | 4 | 7 | 6 | 1 | Soft | 26 | 7 | 10 | 20 |

It will be noted that, with the exception of Examples 3 to 8 and 10 to 13, the films are soft and sticky without any mechanical or physical properties. However, the solutions of Examples 4 to 7 did not develop "crawling" while thermosetting, and they thermoset to hard, tough, mar resistant, and smooth films which are free from craters and pinholes. The films resist acetone and other solvents.

It will be further noted that the films of Examples 10 to 13 are hard. However, the appearance of thermoset coating is extremely poor with a preponderance of craters on the surface and bad crawling of the coating from the corners and edges. The films are non-uniform in thickness and do not render the surface satisfactory with respect to chemical or physical protection of the substrate. Significantly, nonbranched-chain polyhydric aliphatic alcohols do not impart the desired attributes to the substrates so-coated.

Simlar films are obtained when trimethylol ethane is employed in lieu of hydroxypivalyl hydroxypivalate. When omitting the acid catalyst in each of the examples, similar films are obtained when baking or curing to a temperature of 175°C. instead of a temperature of 125°C.

EXAMPLES 14 to 17

Several solutions of urea resin as above-defined, dipropylene glycol,

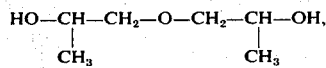

and acid catalyst are utilized as in Examples 2 to 13 above. The compositions and hardness results of the cured films are summarized in Table II below.

Table II

| Composition Parts by Weight | EXAMPLES | | | |
|---|---|---|---|---|
| | 14 | 15 | 16 | 17 |
| Urea Resin (Example 1) | 40 | 50 | 60 | 70 |
| Dipropylene Glycol | 60 | 50 | 40 | 30 |
| p-Toluol Sulfonic Acid 20 Solution in Isopropanol | 3 | 3 | 3 | 3 |
| PROPERTIES | | | | |
| Knoop Hardness | 4 | 20 | 10 | 3 |
| Impact Resistance (reverse) (in. pounds) | 60 | 30 | 30 | — |
| Acetone Resistance (rubs) in which "10" is excellent and "0" is poor. | 8 | 10 | 10 | 3 |

EXAMPLE 18

A solution of the following components is prepared by admixing 50 parts of urea resin (Example 1), 50 parts of dipropylene glycol, 90 parts of rutile titanium dioxide, and 3 parts of p-toluenesulfonic acid (20% solution). The mixture of above components is ground on a three roll mill. The viscous solution is drawn on aluminum panels and baked for ten minutes at 125°C. The resulting film has a very high gloss and a pencil hardness of H-2H.

EXAMPLES 19 to 21

Several solutions of urea resin, dipropylene glycol, and acid catalyst as indicated in Table III below are prepared and cast on aluminum.

TABLE III

| Composition | EXAMPLES | | |
|---|---|---|---|
| | 19 | 20 | 21 |
| Urea Resin (Example 1) | 70 | 60 | 50 |
| Dipropylene Glycol | 30 | 40 | 50 |
| Sulfuric Acid (30% in Alcohol) | 3 | 3 | 3 |
| PROPERTIES | | | |
| Knoop Hardness | 6.7 | 5.4 | 2 |
| Film Thickness (Mil) | 1.2 | 1.2 | 0.8 |
| Impact Resistance (Reverse) (inch pounds) | 30 | 20 | — |

The wet film thickness is 2.0 mil. The coating is baked at 100°C. for ten minutes. Films drawn with the solution of Example 19, for instance, on aluminum and glass, are dry to the touch and completely cross-linked either after 16 hours at room temperature or after a baking cycle of one minute at 150°C. The acid-catalyzed mixtures exhibit only slight, almost undetectible viscosity increases after seven days at room temperature.

EXAMPLE 22

This example illustrates a composition according to the present invention containing an acrylic resin as non-volatile viscosity modifier and ethanol as volatile diluent. The acrylic resin is a copolymer of butyl acrylate, styrene, and hydroxypropyl maleate (50/30/20) dissolved in n-butanol.

A solution is prepared of 80 parts of urea resin (Example 1), 80 parts of dipropylene glycol, 54 parts of acrylic resin (75% solution). 180 parts of rutile titanium dioxide, 1.0 part of diisopropanolamine, and 4 parts of p-toluenesulfonic acid (20% solution in isopropanol). The resulting composition is of brushable viscosity. To this is added 25 parts of ethanol (96%) as volatile diluent.

The above components are mixed in a ball mill. The resultant 90% solids composition is of sprayable viscosity and has a viscosity of 35" Ford 4 Cup. Aluminum panels are next sprayed and baked ten minutes at 125°C. and have a good appearance and a pencil hardness of 3H–4H. The composition sprays readily and the applied coating does not sag.

EXAMPLE 23

The procedure of Example 18 is repeated except that the solution is thinned to brushable viscosity by addition of a small quantity of water. The resulting solution provides clear, glossy hard coatings when applied to primed steel panels and to hardwood veneer and thermoset.

I claim:

1. A solution consisting essentially of (A) 80% to 10% by weight of a syrupy mixture of thermosetting methylated urea-formaldehyde condensates composed of inter-reacted urea, formaldehyde and methanol in 1 : 2–3 : 1–2.5 molar ratio respectively, wherein 10 to 60% by weight of said mixture is monomeric, 10 to 75% by weight is dimeric, 5 to 60% by weight is trimeric, and 10 to 30% by weight is in excess of trimeric, said percentages totalling 100; and (B) 20 to 90% by weight of a branched-chain $C_3$–$C_{18}$ polyhydric compound having a molecular weight less than 500.

2. A solution according to claim 1 wherein the ratio of inter-reacted urea, formaldehyde and methanol in the condensate is 1 : 2.4 : 1.6.

3. A solution according to claim 1 containing a small but effective amount of an acid poly condensation catalyst.

4. A solution according to claim 3 wherein the catalyst is p-toluenesulfonic acid.

5. A solution according to claim 1 wherein the weight of the polyhydric cross-linking agent is ½ to ⅔ the weight of the urea-formaldehyde condensate.

6. A solution according to claim 1 containing 10% by weight of ethanol.

7. A solution according to claim 1 wherein the polyhydric compound is hydroxypivalyl hydroxypivalate.

8. A solution according to claim 1 wherein the polyfunctional alcoholic reactant is trimethylol propane.

9. A solution according to claim 1 in which the polyhydric compound is a 50 : 50 mixture of 2-methyl-2,4-pentanediol and hydroxypivalyl hydroxypivalate, respectively.

10. A solution according to claim 1 in which the polyhydric compound is trimethylol ethane.

* * * * *